(12) United States Patent
Matsushima

(10) Patent No.: US 7,869,448 B2
(45) Date of Patent: Jan. 11, 2011

(54) NETWORK, MEDIA GATEWAY DEVICE AND INTERNAL RESOURCE MANAGEMENT METHOD USED IN SAME

(75) Inventor: Kensuke Matsushima, Tokyo (JP)

(73) Assignee: NEC Corporation, Tokyo (JP)

( * ) Notice: Subject to any disclaimer, the term of this patent is extended or adjusted under 35 U.S.C. 154(b) by 729 days.

(21) Appl. No.: 11/698,170

(22) Filed: Jan. 26, 2007

(65) Prior Publication Data
US 2007/0177618 A1    Aug. 2, 2007

(30) Foreign Application Priority Data
Feb. 1, 2006    (JP) .............................. 2006-024011

(51) Int. Cl.
H04L 12/56    (2006.01)
H04L 12/28    (2006.01)
(52) U.S. Cl. .................. 370/401; 370/252; 370/522
(58) Field of Classification Search .............. 370/236, 370/353, 401, 338; 709/227, 224
See application file for complete search history.

(56) References Cited

U.S. PATENT DOCUMENTS

| | | | |
|---|---|---|---|
| 6,711,159 B1* | 3/2004 | Grabelsky et al. | 370/353 |
| 6,799,210 B1* | 9/2004 | Gentry et al. | 709/223 |
| 7,051,083 B1* | 5/2006 | Graf et al. | 709/218 |
| 7,076,040 B2* | 7/2006 | Carson et al. | 379/115.01 |
| 7,292,687 B2* | 11/2007 | Graf et al. | 379/219 |
| 7,424,025 B2* | 9/2008 | Qian et al. | 370/409 |
| 7,453,890 B2* | 11/2008 | Quilty et al. | 370/401 |
| 7,613,111 B2* | 11/2009 | Soncodi | 370/230 |
| 7,634,577 B1* | 12/2009 | Grabelsky et al. | 709/238 |
| 2003/0193696 A1* | 10/2003 | Walker et al. | 358/402 |
| 2004/0218612 A1* | 11/2004 | Zetterlund et al. | 370/401 |
| 2004/0240389 A1* | 12/2004 | Bessis et al. | 370/252 |
| 2007/0116018 A1* | 5/2007 | Doleh et al. | 370/401 |
| 2007/0160031 A1* | 7/2007 | Sylvain | 370/352 |

FOREIGN PATENT DOCUMENTS

CN    1595917 (A)    3/2005

OTHER PUBLICATIONS

RFC 3525 published by the network working group on Jun. 2003.*

(Continued)

*Primary Examiner*—Michael J Moore, Jr.
(74) *Attorney, Agent, or Firm*—McGinn IP Law Group, PLLC

(57) ABSTRACT

To provide a media gateway device that can eliminate partition loss of internal resources of an MGW and effectively utilize the internal resources of the MGW. When starting or restarting service of an MGW, a call control management part of the MGW sends a service registration request signal to MGCs. The MGCs that receive the service registration request signal send back a service registration request response signal as a response. The call control management part registers an MGC from which a response was normally received as an object for implementation of call processing. Upon reception of a service registration request response signal from at least one MGC, the call control management part enters an in-service state. The call control management part periodically performs resending of service registration request signals only to MGCs from which a response can not be normally received.

18 Claims, 8 Drawing Sheets

OTHER PUBLICATIONS

"Megaco Protocol Version 1.0 11. MC-MCG Control Interface" [RFC (Request for Comments) 3015, Nov. 2000].

IEFT RFC3525 ["Gateway Control Protocol Version 1"(Jun. 2003)].

Chinese Office Action dated Jun. 11, 2010, with English translation.

* cited by examiner

NETWORK, MEDIA GATEWAY DEVICE AND INTERNAL RESOURCE MANAGEMENT METHOD USED IN SAME

BACKGROUND OF THE INVENTION

1. Field of the Invention

The present invention relates to a network, a media gateway device and an internal resource management method used in the network, and more particularly to a method of managing internal resources of an MGW (Media Gateway) that is controlled from a plurality of MGCs (Media Gateway Controller).

2. Related Art

The processing capacities of DSPs (Digital Signal Processors) for VoIP (Voice over Internet Protocol) are being enhanced in recent years and the number of channels that can be processed with a single DSP is increasing. Accompanying this, devices for large size networks that can accommodate a large number of channels have been emerging with respect to MGWs also.

However, in some cases an MGC that controls the MGW does not have enough processing capacity to control all of the channels that are accommodated by the MGW. An MGC controls an MGW using the Megaco. (Media Gateway Control)/H.248 protocol (ITU-TH.248) that is standardized by ITU-T (International Telecommunication Union—Telecommunication Standardization Sector) or IETF (Internet Engineering Task Force) (for example, see "Megaco Protocol Version 1.0 11. MG-MGC CONTROL INTERFACE" [RFC (Request For Comments) 3015, November 2000, pp. 71-75]).

However, in the Megaco, since the relationship between an MGC and MGW is that of master/slave, it is fundamentally a one-to-one relationship between the MGC and the MGW and in some cases the capacity of the MGW cannot be fully exerted.

In the conventional MGW control by a MGC as described above, there is a problem that, since it is necessary for the MGC and the MGW to have a one-to-one relationship, a partition loss arises in the resources in the MGW and the resources cannot be effectively utilized.

More specifically, in the conventional MGW control by a MGC, for respective MGCs, the resources inside the MGW are partitioned in a fixed manner for each MGC unit, and a one-to-one relationship is established virtually and fixedly between each MGC and the virtually partitioned MGW to implement call processing, and thus a partition loss arises with respect to the resources in the MGW and the resources cannot be effectively utilized.

BRIEF SUMMARY OF THE INVENTION

An object of the present invention is to solve the above described problem and provide a network and media gateway device that can eliminate a partition loss for internal resources of an MGW to effectively utilize the internal resources of the MGW, as well as an internal resource management method that is used in the network.

A network according to the present invention is a network in which a plurality of media gateway controllers control a media gateway device, wherein, the media gateway device comprises means for sending a service registration request to the plurality of media gateway controllers, means for registering in the media gateway device a media gateway controller that normally returns a response to the service registration request, and means for notifying internal resource information of the media gateway device to the plurality of media gateway controllers when the media gateway device receives a resource information request that requests the internal resource information of the media gateway device from any of the plurality of media gateway controllers;

and wherein the media gateway device enables use of internal resources by the media gateway controller that is registered in the media gateway device.

A media gateway device according to the present invention is a media gateway device that is controlled with a plurality of media gateway controllers, comprising:

means for sending a service registration request to the plurality of media gateway controllers, means for registering in the media gateway device a media gateway controller that normally returns a response to the service registration request, and means for notifying internal resource information of the media gateway device to the plurality of media gateway controllers when the media gateway device receives a resource information request that requests the internal resource information of the media gateway device from any of the plurality of media gateway controllers;

wherein, the media gateway device enables use of internal resources by the media gateway controller that is registered in the media gateway device.

An internal resource management method according to the present invention is a method of managing internal resources in a media gateway device in a network in which a plurality of media gateway controllers control the media gateway device, wherein, the media gateway device executes processing that sends a service registration request to the plurality of media gateway controllers, processing that registers in the media gateway device a media gateway controller that normally returns a response to the service registration request, and processing that notifies internal resource information of the media gateway device to the plurality of media gateway controllers when the media gateway device receives a resource information request requesting the internal resource information of the media gateway device from any of the plurality of media gateway controllers;

and wherein the media gateway device enables use of internal resources by the media gateway controller that is registered in the media gateway device.

More specifically, a network according to the present invention is a network in which a plurality of MGCs (Media Gateway Controllers) control an MGW (Media Gateway), wherein the MGW comprises means for sending a service registration request to the plurality of MGCs, means for registering in the MGW an MGC that normally returns a response to the service registration request, and means for notifying internal resource information of the MGW to the plurality of MGCs when the MGW receives a resource information request that requests the internal resource information of the MGW from any of the plurality of MGCs.

Thus, according to the network of this invention, by registering a plurality of MGCs with which an MGW communicates and appropriately notifying all of the MGCs of changes in resource information of the MGW, it is possible to eliminate a partition loss that arises with respect to the resources of the MGW to effectively utilize the internal resources of the MGW.

In an ordinary Multiple Virtual MGW as specified by IETF RFC3525 ["Gateway Control Protocol Version 1" (June 2003)], for respective MGCs, the internal resources of the MGW are partitioned for each MGC unit, and each MGC and the virtually partitioned MGW enter a one-to-one relationship virtually to implement call processing.

In contrast, according to the network of the present invention it is possible for all of a plurality of MGCs that connect to an MGW to flexibly use the internal resources of the MGW without partitioning the internal resources of the MGW for respective MGCs.

More specifically, according to the network of the present invention, in a case where the resources of an MGC #0 are taken as "1,000 channels", among the internal resources of the MGW, internal resources for use by MGC #0 are partitioned, and those internal resources #0 consist of "1,000 channels". At this time, MGC #0 can use only the internal resources #0 among the internal resources of the MGW. However, MGC #1 and MGC #n cannot use the internal resources #0 of the MGW.

More specifically, only the internal resources #0 of the MGW can be used by MGC #0, and the internal resources #0 cannot-be used by MGC #1 and MGC #n. This relationship is referred to as the aforementioned "one-to-one relationship". Likewise, the internal resources of the MGW that can be used by MGC #1 are only internal resources #1, and this is a one-to-one relationship. Further, the internal resources of the MGW that can be used by MGC #n are only internal resources #n, and this is also a one-to-one relationship.

It is possible to eliminate the above described one-to-one relationship so that each of the MGCs from MGC #0 to MGC #n can freely use the internal resources of the MGW as long as the use is within the processing capacity thereof. In short, when the internal resources of the MGW are taken as a maximum of "3,000 channels", since a total of "1,000 channels" of the internal resources of the MGW are already used by MGC #0 and MGC #1, the remaining "2,000 channels" can be freely used by MGCs other than MGC #0 and MGC #1. As a result, even when the internal resources of the MGW are not being used, it is possible for a different MGC other than a specified MGC to freely use the internal resources of the MGW, and since a partition loss does not occur, the internal resources of the MGW can be effectively utilized. Further, according to the network of the present invention, the amount of control processing for MGCs in an MGW decreases.

DETAILED DESCRIPTION OF THE PREFERRED EMBODIMENTS

Figure 1:
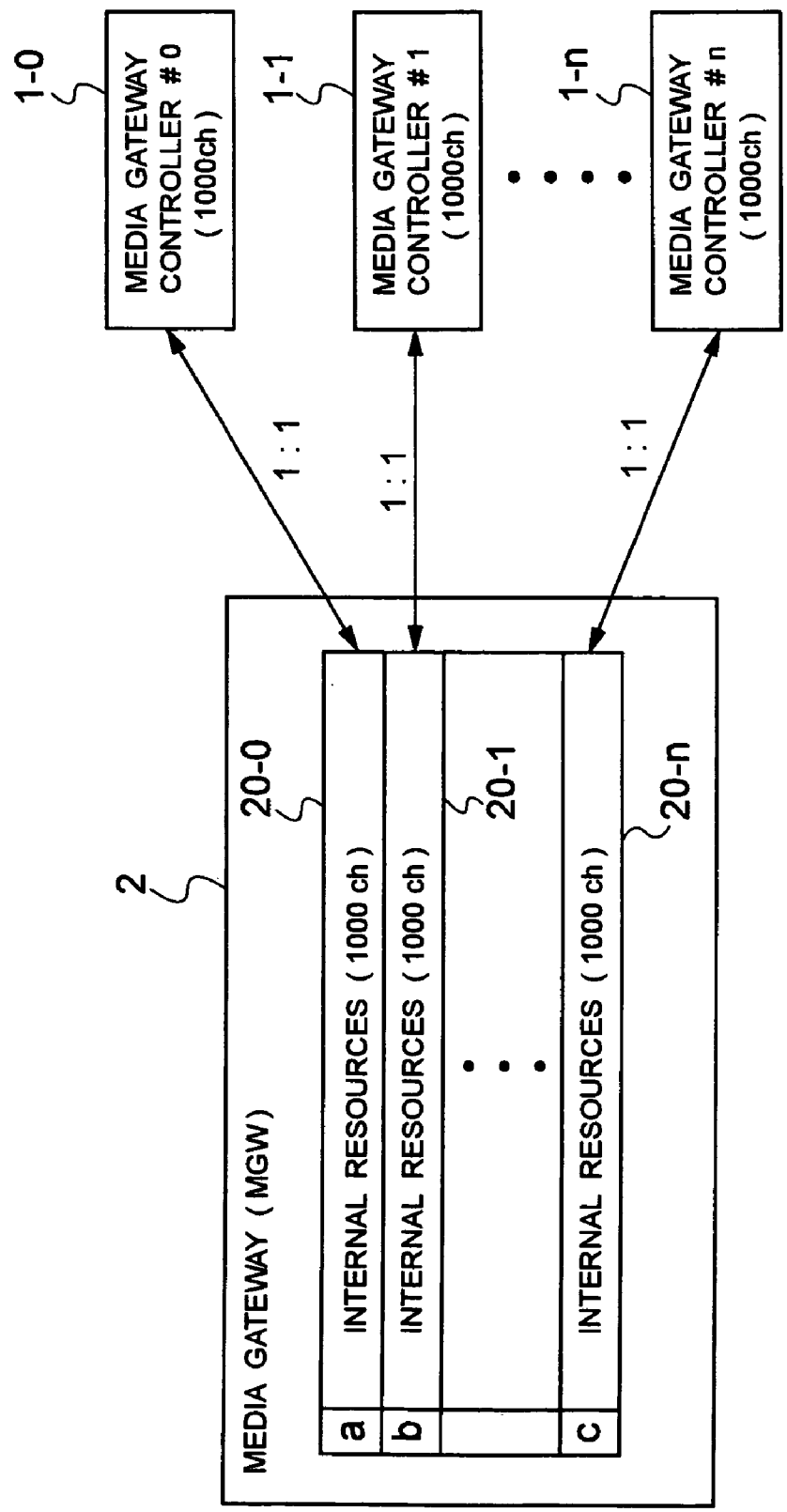
FIG. 1 is a view for illustrating the operations of an MGW according to an embodiment of this invention.
Figure 2:
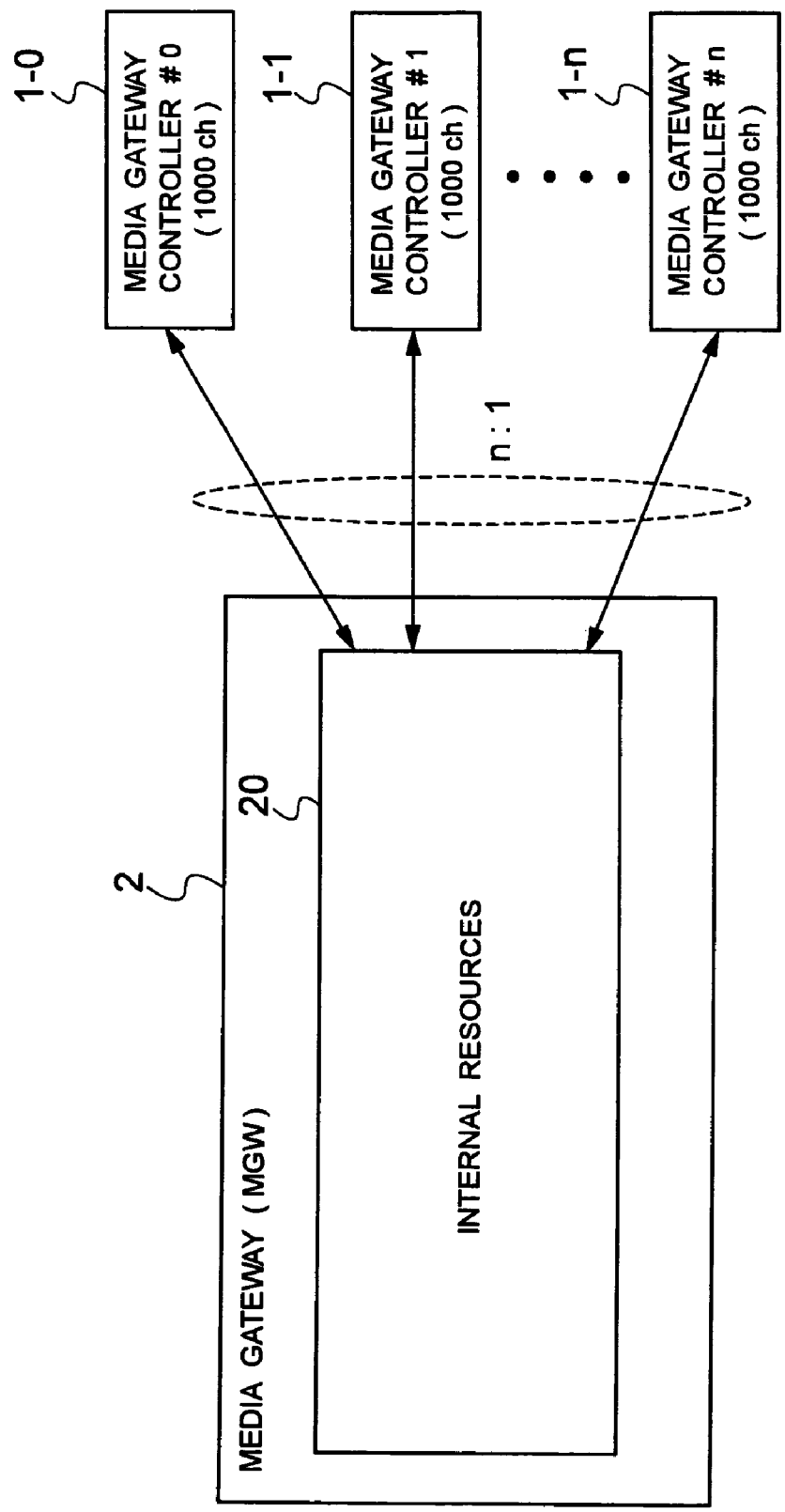
FIG. 2 is a view for illustrating the operations of an MGW according to an embodiment of this invention.
Figure 3:
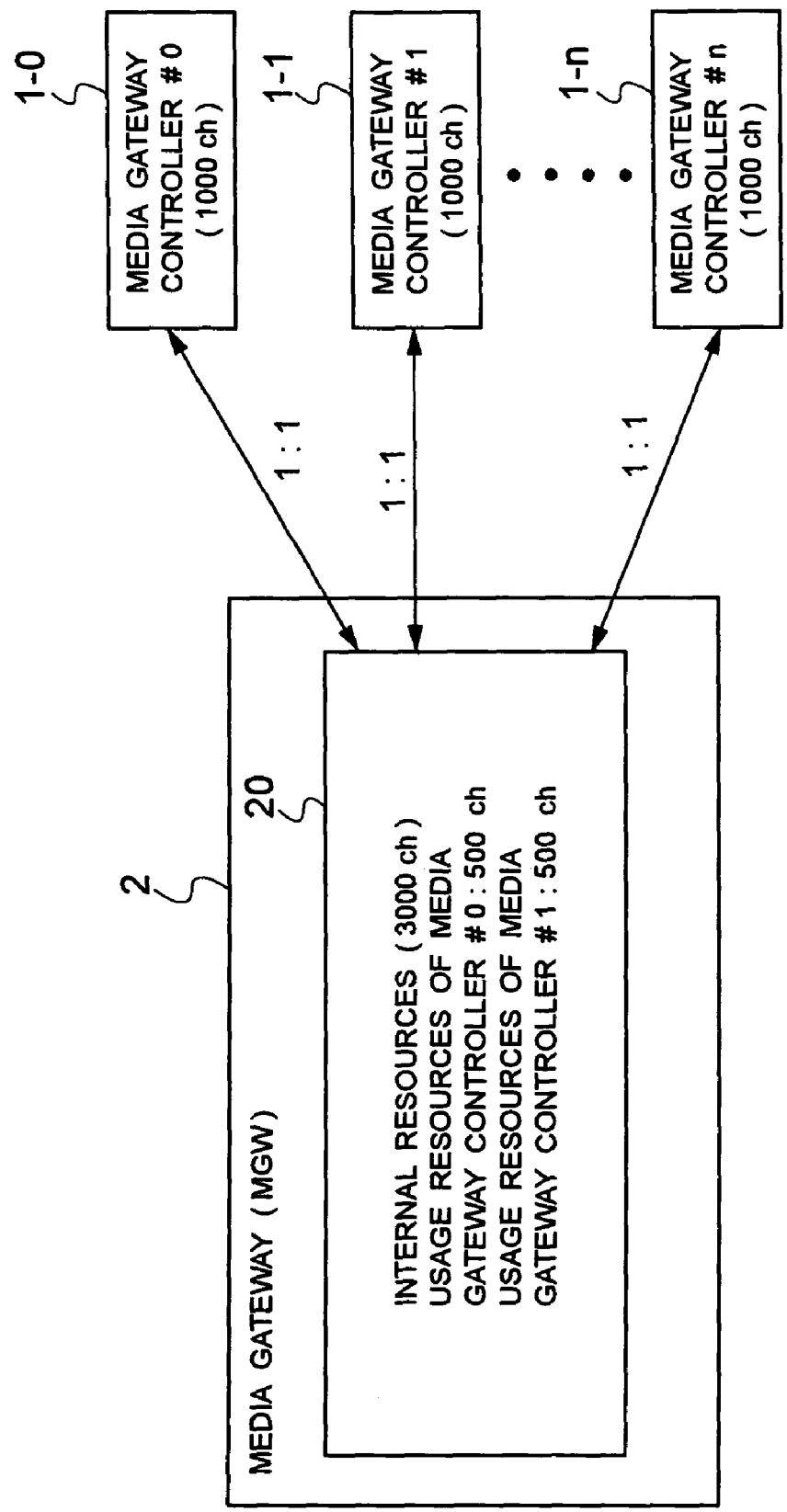
FIG. 3 is a view for illustrating the operations of an MGW according to an embodiment of this invention.

Next, embodiments of the present invention will be described with reference to the drawings. FIGS. 1 to 3 are views for illustrating the operations of an MGW (Media. Gateway) according to an embodiment of this invention. In FIGS. 1 to 3, a network according to the embodiment of this invention is composed by an MGW 2 and MGCs (Media Gateway Controllers) (#0 to #n) 1-0 to 1-n.

In FIG. 1, when the resources of the MGC#0 (1-1) are taken as "1000 channels", among the internal resources of the MGW 2, internal resources for use by MGC(#0) 1-0 are partitioned, and those internal resources 20-0 are set as "1,000 channels". At this time, the MGC(#0) 1-0 can use only the internal resources 20-0 among the internal resources 20-0 to 20-n of the MGW 2. However, MGC(#l) 1-1 to MGC(#n) 1-n cannot use the internal resources 20-0 of the MGW 2.

That is, only the internal resources 20-0 of the MGW 2 can be used by the MGC(#0) 1-0, and the internal resources 20-0 cannot be used by the MGC(#1) 1-1 to MGC(#n) 1-n. This relationship is referred to as the aforementioned "one-to-one relationship". Likewise, the internal resources of the MGW 2 that can be used by the MGC(#1) 1-1 are only the internal resources 20-1, and this is a one-to-one relationship. Further, the internal resources of the MGW 2 that can be used by MGC(#n) 1-n are only the internal resources 20-n, and this is also a one-to-one relationship.

In this embodiment, it is possible to eliminate the above described one-to-one relationships and, as shown in FIG. 2, enable each of the MGCs from the MGC(#0) 1-0 to the MGC(#n) 1-n to freely use the internal resources of the MGW 2 as long as the use is within the processing capacity thereof.

This will now be simply explained using FIG. 3. In this case, when the internal resources of the MGW 2 are taken as a maximum of "3,000 channels", since the internal resources 20 totaling "1,000 channels" of the MGW 2 are already being used by the MGC(#0) 1-0 and MGC(#1) 1-1, the remaining "2,000 channels" can be freely used by MGC(#2) 1-2 to MGC(#n) 1-n that are other than the MGC(#0) 1-0 and MGC (#1) 1-1.

As a result, even when the internal resources 20 of the MGW 2 are not being used, a different MGC other than a specified MGC can freely use the internal resources of the MGW, and since a partition loss does not occur, the internal resources 20 of the MGW 2 can be utilized effectively. Further, according to this embodiment, the control processing for the MGC(#0) 1-0 to MGC(#n) 1-n at the MGW 2 decreases.

Figure 4:
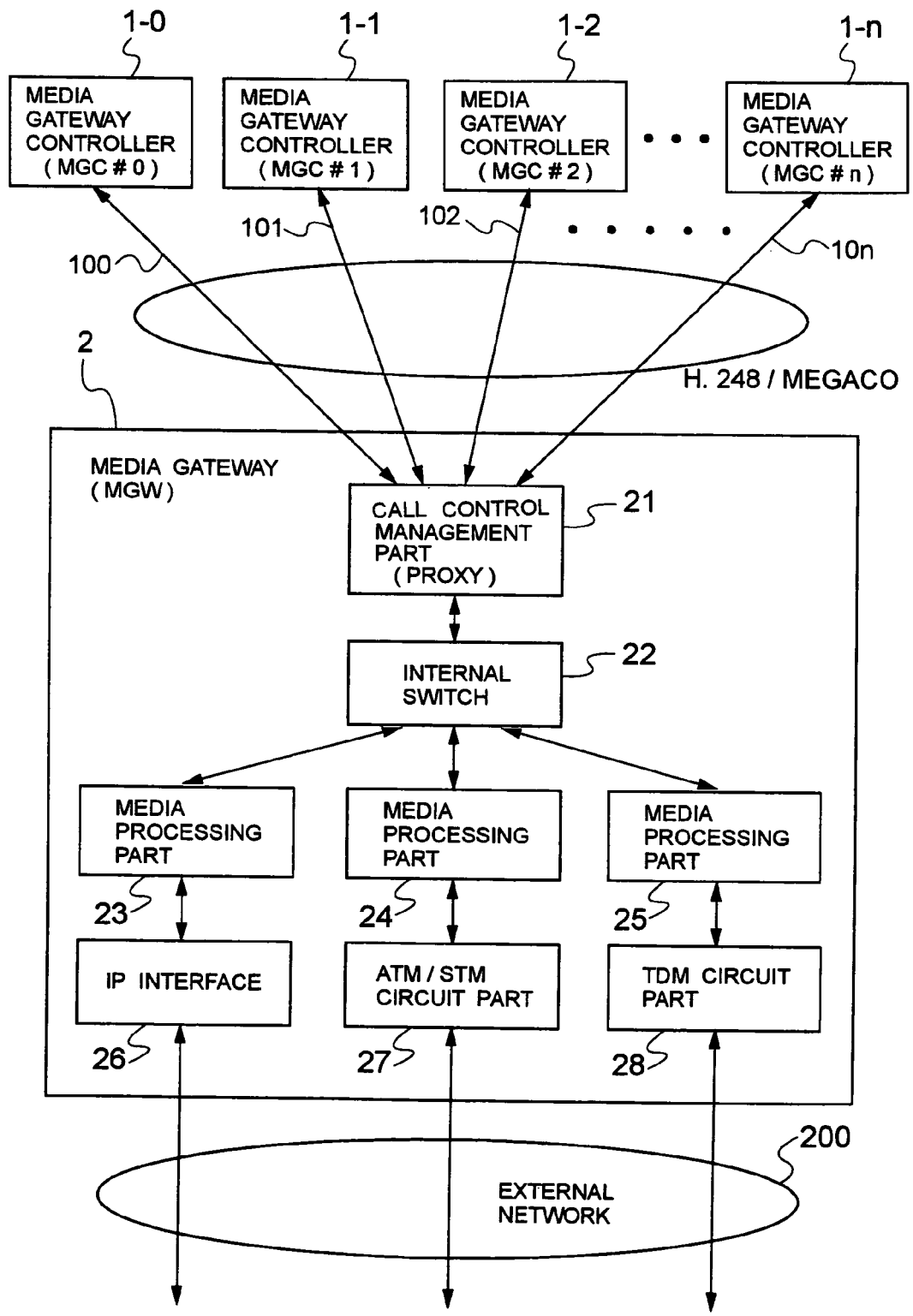
FIG. 4 is a block diagram showing the configuration of the MGW shown in FIG. 3.

FIG. 4 is a block diagram showing the configuration of the MGW 2 shown in FIG. 3. In FIG. 4, the MGW 2 includes a call control management part (proxy) 21, an internal switch 22, media processing parts 23 to 25, an IP (Internet Protocol) interface 26, an ATM (Asynchronous Transfer Mode)/STM (Synchronous Transfer Mode) circuit part 27 and a TDM (Time Division Multiplexing) circuit part 28.

The MGC (#0) 1-0 to MGC (#n) 1-n administer call processing, while the call control management part 21 of the MGW 2 administers call processing [H.248/MEGACO(Media Gateway Control) terminating functions] with the MGC (#0) 1-0 to MGC(#n) 1-n. In this case, the call control management part 21 is connected to the MGC(#0) 1-0 to MGC (#n) 1-n via signal lines 100 to 10n.

The internal switch 22 transfers call control information to the media processing parts 23 to 25, and transfers voice data and voice packets that are processed at the media processing parts 23 to 25. The IP interface 26 administers the sending and receiving of voice packets to and from an external network 200. The ATM/STM circuit part 27 and the TDM circuit part 28 perform sending and receiving of voice data to and from the external network 200.

The media processing part 23 converts voice packets that are received from the IP interface 26 into voice data. The media processing parts 24 and 25 convert voice data that are received from the ATM/STM circuit part 27 and the TDM circuit part 28 into voice packets.

Figure 5:
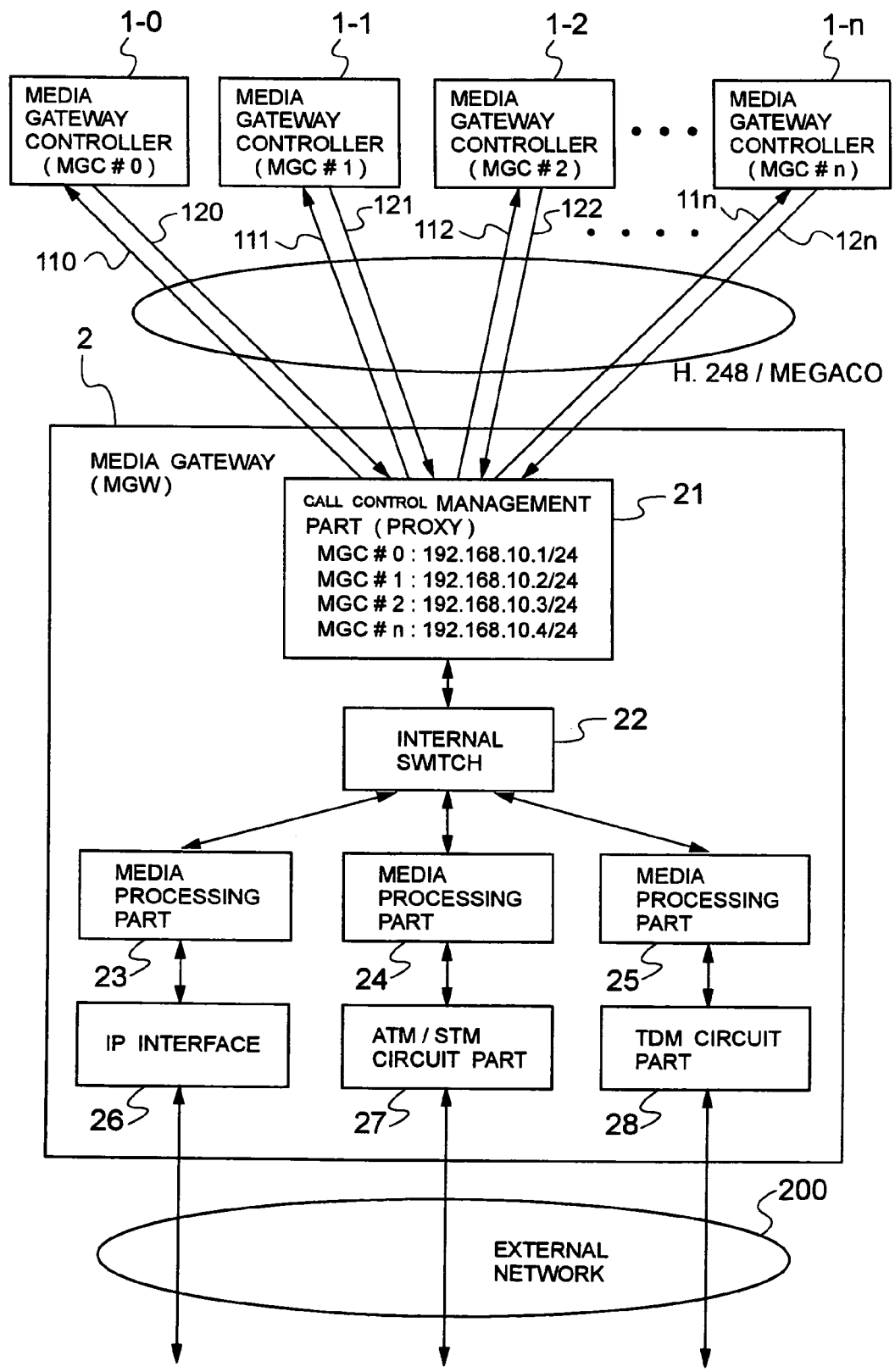
FIG. 5 is a view for illustrating the operations of a network according to an embodiment of this invention.
Figure 6:
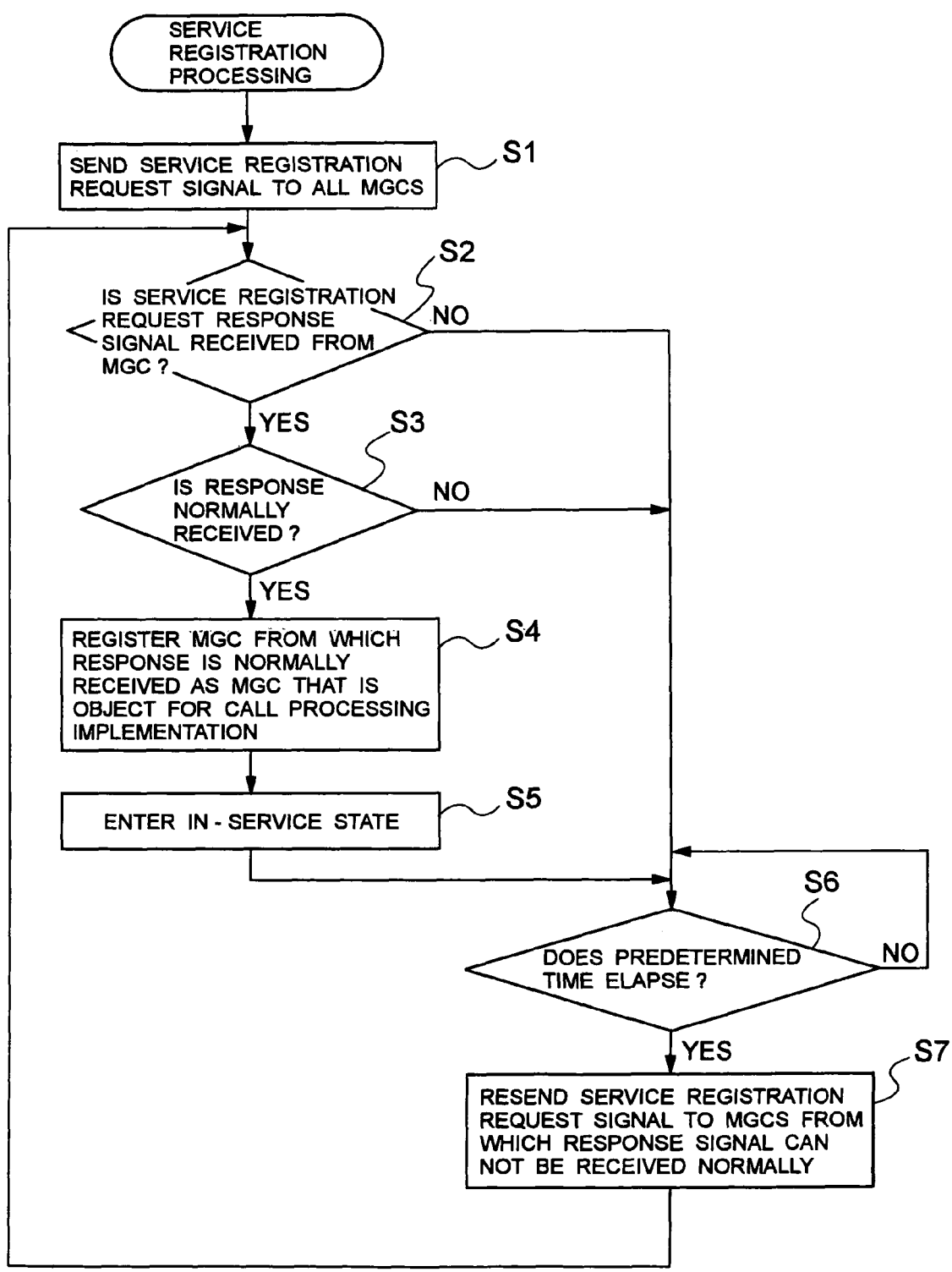
FIG. 6 is a flowchart that illustrates service registration processing performed by a call control management part shown in FIG. 5.
Figure 7:
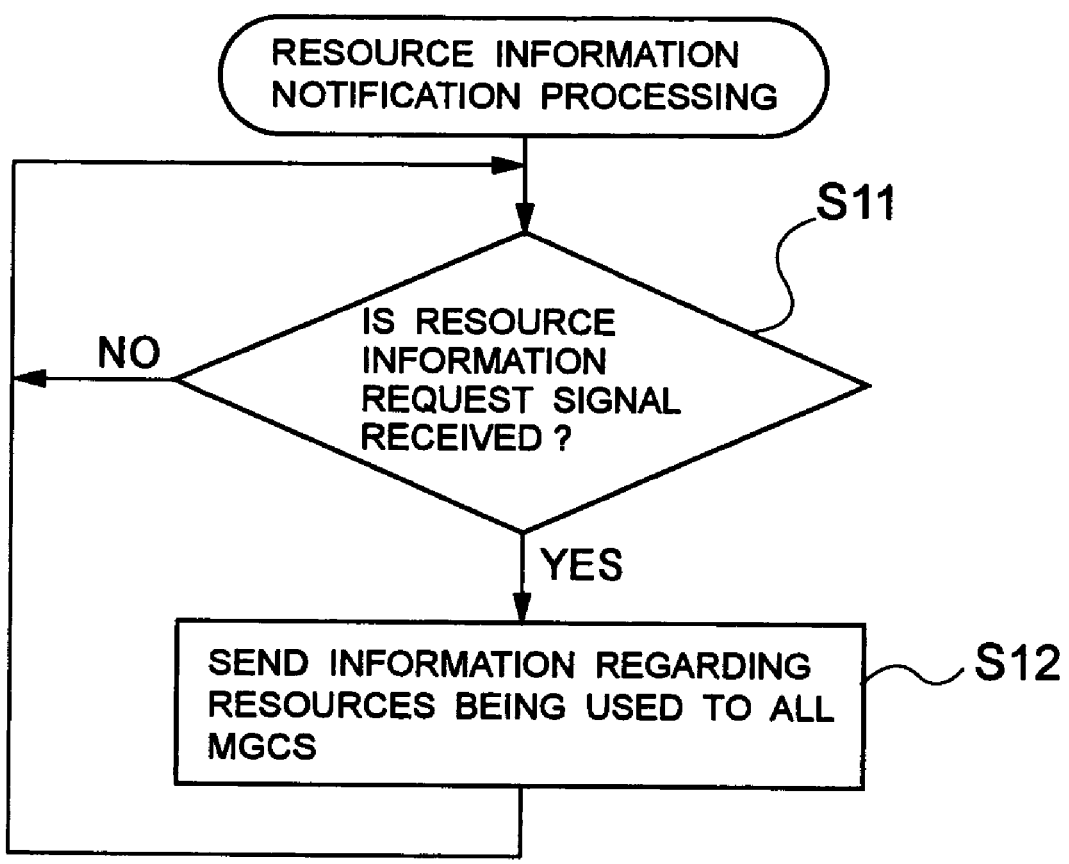
FIG. 7 is a flowchart that illustrates resource information notification processing performed by the call control management part shown in FIG. 5.

FIG. 5 is a view for illustrating the operations of a network according to the embodiment of this invention, FIG. 6 is a flowchart that illustrates service registration processing that is performed by the call control management part 21 shown in FIG. 5, and FIG. 7 is a flowchart that illustrates resource information notification processing that is performed by the call control management part 21 shown in FIG. 5. The operations of the network according to the embodiment of this invention will now be described with reference to FIG. 5 to FIG. 7.

The call control management part 21 of the MGW 2 registers information of the MGC (#0) 1-0 to MGC (#n) 1-n to perform sending and receiving of call control information (H.248/MEGACO) with respect to the MGC(#0) 1-0 to MGC (#n) 1-n. According to this embodiment, the information of the MGC(#0) 1-0 to MGC(#n) 1-n is registered as IP address information (for example, [MGC#0: 192.168.10.1/24], [MGC#1: 192.168.10.2/24], [MGC#2: 192.168.10.3/24], [MGC#n: 192.168.10.4/24]). The call control management part 21 sends a service request signal to these IP addresses, and by receiving a response thereto specifies the relevant MGCs as MGCs that carry out call processing.

First, when starting or restarting service of the MGW 2, the call control management part 21 sends service registration request signals 110 to 11n to the MGC(#0) 1-0 to MGC(#n) 1-n (step Si in FIG. 6). The MGC(#0) 1-0 to MGC(#n) 1-n that receive the service registration request signals 110 to 11n send service registration request response signals 120 to 12n to the call control management part 21.

The call control management part 21 registers MGCs from which a response is normally received as MGCs that are objects for implementation of call processing (steps S2 to S4 in FIG. 6). When the call control management part 21 receives a service registration request response signal from at least one MGC, the call control management part 21 enters an in-service state (step S5 in FIG. 6). Further, the call control management part 21 repeats resending of the service registration request signals 110 to 11n at predetermined periods (steps S6 and S7 in FIG. 6) to only MGCs from which a response could not be normally received.

Thus, even when the MGW 2 is in service, as long as a service registration request response signal is normally received from an MGC, it is possible to additionally register the MGC as an MGC that is an object for call processing implementation.) By this procedure the MGW 2 can specify MGCs as objects for call processing implementation.

Although any protocol may be used for the service registration request signals 110 to 11n and service registration request response signals 120 to 12n, according to this embodiment, by using the H.248/MEGACO protocol, even in a multi-vendor environment it is possible to send and receive signals between the MGW 2 and the MGC(#0) 1-0 to MGC (#n) 1-n to achieve a more versatile network.

In the case of the H.248/MEGACO protocol, "Service Change (Restart, Root Termination)" is sent and received as the service registration request signals 110 to 11n and service registration request response signals 120 to 12n. It is thereby possible for the MGC (#0) 1-0 to MGC (#n) 1-n to use all of the media processing parts 23 to 25 of the MGW 2.

Further, in a case in which a media processing part among the media processing parts 23 to 25 can no longer be used due to a failure or the like, the information of the media processing part that can no longer be used is notified to the MGC(#0) 1-0 to MGC(#n) 1-n by sending "Service Change (Forced)" of H.248/MEGACO. The MGC(#0) 1-0 to MGC(#n) 1-n that receive this information recognize that the overall resources of the MGW 2 have been reduced, and call regulating control can also be performed at times of a heavy load.

An example of the above procedures will now be described for a case of using the H.248/MEGACO protocol. First, when the media processing parts 23 and 24 shown in FIG. 5 can no longer be used, the call control management part 21 sends a "Service Change (Termination ID=ROOT, Method=Restart)" command to each of the MGC(#0) 1-0 to MGC(#n) 1-n (Procedure 1). The call control management part 21 then receives responses to the commands that are sent with the above described Procedure 1, and registers MGCs sending the responses as objects for call processing implementation (Procedure 2).

The call control management part 21 notifies the fact that the media processing parts 23 and 24 can no longer be utilized to each of the MGC (#0) 1-0 to MGC (#n) 1-n using a "Service Change (Termination ID=Media Processing Part 23, Method=Forced)" command and a "Service Change (Termination ID=Media Processing Part 24, Method=Forced)" command (Procedure 3).

When the media processing parts 23 and 24 have been restored, the call control management part 21 notifies each of the MGC (#0) 1-0 to MGC(#n) 1-n using a "Service Change (Termination ID=Media Processing Part 23, Method=Restart) "command and a" Service Change (Termination ID=Media Processing Part 24, Method=Restart)" command (Procedure 4).

By means of the above described procedures 1 to 4, specification of the MGC(#0) 1-0 to MGC(#n) 1-n as objects for call processing implementation and notification of a change in the state of the media processing parts 23 to 25 can be performed by the MGW 2.

Next, in order for a plurality of MGCs to control the single MGW 2, it is necessary for the MGW 2 to notify the resource information that is used by the MGW 2:to each of the MGC (#0) 1-0 to the MGC(#n) 1-n. This will now be described referring to FIG. 5 and FIG. 7.

All of the MGCs from the MGC(#0) 1-0 to the MGC(#n) 1-n send resource information request signals 120 to 12n to the call control management part 21 of the MGW 2. Upon receiving the resource information request signals 120 to 12n (step S11 of FIG. 7), the call control management part 21 of the MGW 2 sends resource information response signals 110 to 11n that contain information regarding the resources being used as a response to all of the MGCs from the MGC(#0) 1-0 to the MGC(#n) 1-n (step S12 in FIG. 7).

Thereby, all of the MGCs from the MGC (#0) 1-0 to the MGC(#n) 1-n can acquire information regarding the resources being used at the MGW 2. In this case, the MGC (#0) 1-0 to the MGC(#n) 1-n and the MGW 2 are not in a one-to-one relationship, and they can form an n-to-1 relationship.

Although any protocol may be used for the resource information request signals 120 to 12n and resource information response signals 110 to 11n, according to this embodiment, by using the H.248/MEGACO protocol, even in a multi-vendor environment it is possible to send and receive signals between the MGW 2 and the MGC(#0) 1-0 to MGC(#n) 1-n to achieve a more versatile network.

In the case of the H.248/MEGACO protocol, "Audit Value (for ROOT Termination)" or "Audit Value (for media processing parts 23 to 25) " is sent and received as the resource information request signals 120 to 12n and resource information response signals 110 to 11n. More specifically, two kinds of methods are available as a method of sending the resource information request signals 120 to 12n. One is a method that specifies "ROOT Termination" which bundles the media processing parts 23 to 25 to send "Audit Value", and the other is a method that specifies the media processing parts 23 to 25 individually to send "Audit Value".

Hereunder, the procedures of the method that specifies "ROOT Termination" which bundles the media processing parts 23 to 25 to send "Audit Value" are described.

The MGC(#0) 1-0 to MGC (#n) 1-n send "Audit Value (for ROOT Termination)" to the call control management part 21 of the MGW 2 (Procedure 1).

After receiving "Audit Value (for ROOT Termination)" of the above described Procedure 1, the call control management part 21 of the MGW 2 sends information regarding the resources being used in the MGW 2 overall as a response signal to all of the MGCs from the MGC(#0) 1-0 to the MGC(#n) 1-n (Procedure 2) By means of the above procedures, the MGC (#0) 1-0 to MGC (#n) 1-n can share information regarding the resources being used in the MGW 2 overall without it being necessary for the MGCs to cooperate with each other.

Next, the procedures of the method that specifies the media processing parts 23 to 25 individually to send "Audit Value" are described.

The MGC(#0) 1-0 to MGC (#n) 1-n send "Audit Value (for media processing parts 23 to 25)" to the call control management part 21 of the MGW 2 (Procedure 1).

After receiving "Audit Value (for media processing parts 23 to 25)" of the above described Procedure 1, the call control management part 21 of the MGW 2 sends information regarding the resources being used by the media processing parts 23 to 25, respectively, as a response signal to all of the MGCs from the MGC(#0) 1-0 to the MGC(#n) 1-n (Procedure 2).

By means of the above procedures, the MGC (#0) 1-0 to MGC (#n) 1-n can share information regarding the resources being used in the MGW 2 overall without it being necessary for the MGCs to cooperate with each other.

By means of the above described operations, the MGC(#0) 1-0 to MGC (#n) 1-n can have an n:1 relationship with the internal resources of the MGW 2, and not a one-to-one relationship. Further, the MGC(#0) 1-0 to MGC(#n) 1-n can acquire information regarding resources being used in the MGW 2 overall based on only information obtained from the MGW 2, without the need to communicate information regarding the resources being used with each other. Thus, according to this embodiment, resource control functions such as emergency calls and call regulating control are enabled.

It is also possible for MGC(#0) 1-0 to MGC(#n) 1-n to individually control the resource information of the MGW 2 overall. Examples thereof will now be described using the sequences illustrated in FIG. 8 and FIG. 9.

Figure 8:
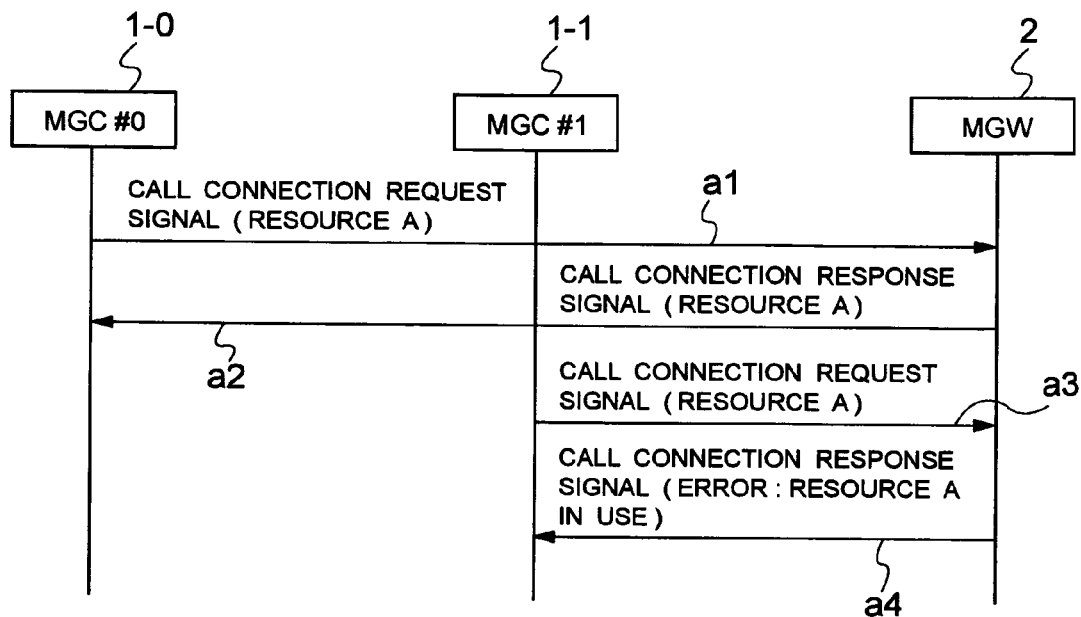
FIG. 8 is a sequence chart that illustrates the operations of a network according to an embodiment of this invention.
Figure 9:
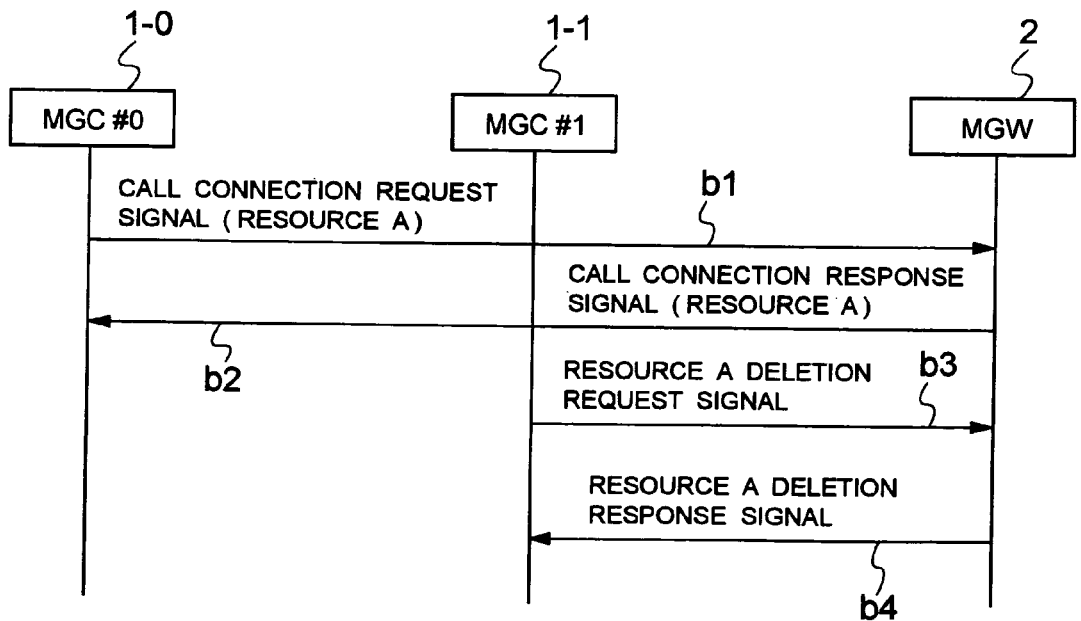
FIG. 9 is a sequence chart that illustrates the operations of a network according to an embodiment of this invention.

FIG. 8 and FIG. 9 are sequence charts that illustrate the operations of the network according to the embodiment of the present invention. In FIG. 8, a call connection request signal (resource A) and call connection response signal (resource A) are exchanged between the MGC(#0) 1-0 and the MGW 2 (see a1 and a2 in FIG. 8), so that resource A of the MGW 2 is used by the MGC(#0) 1-0.

In this state, when the MGC (#1) 1-1 sends a call connection request signal (resource A) to the MGW 2, the MGW 2 returns a call connection response signal (Error: resource A in use) to the MGC(#1) 1-1 (see a3 and a4 of FIG. 8).

Further, in FIG. 9, after the MGC(#0) 1-0 exchanged a call connection request signal (resource A) and a call connection response signal (resource A) with the MGW 2 (see b1 and b2 in FIG. 9), when the resource A is no longer required, the resource A can be deleted by the MGC(#1) sending a resource A deletion request signal to the MGW 2 and receiving a resource A deletion response signal in response from the MGW 2 (see b3 and b4 of FIG. 9).

Conventionally, for respective MGCs, the internal resources of the MGW are fixedly partitioned for each MGC unit, and the respective MGCs and the virtually partitioned internal resources of the MGW enter a one-to-one relationship virtually and fixedly to conduct call processing. In contrast, according to this embodiment there is no necessity to partition and manage the internal resources of the MGW 2, and each of the MGC(#0) 1-0 to MGC (#n) 1-n can freely control the internal resources of the MGW 2. Further, it is possible to reduce the call processing load and administration load between the MGC (#0) 1-0 to MGC (#n) 1-n and the MGW 2, and carry out call regulating control and resource control functions for emergency calls without the MGC(#0) 1-0 to MGC(#n) 1-n having to exchange information regarding the resources being used with each other.

Further, according to this embodiment, since each of the MGC(#0) 1-0 to MGC(#n) 1-n can freely control the internal resources of the MGW 2, even when the processing capacities of the MGC (#0) 1-0 to MGC(#n) 1-n and the MGW 2 have been enhanced, the resources of the MGW 2 can be effectively utilized without a partition loss occurring in the resources.

Although according to this embodiment a C-plane is described as an MGC and a U-plane is described as an MGW, this invention can be also be implemented in a similar manner in a different system in which call control is carried out by cooperation between a C-plane and a U-plane.

What is claimed is:

1. A network in which a plurality of media gateway controllers control a media gateway device, the media gateway device comprising:
   means for sending a service registration request to the plurality of media gateway controllers;
   means for registering in the media gateway device a media gateway controller that normally returns a response to the service registration request; and
   means for notifying internal resource information of the media gateway device to each media gateway controller of the plurality of media gateway controllers when the media gateway device receives a resource information request that requests the internal resource information of the media gateway device from any of the plurality of media gateway controllers,
   wherein the media gateway device enables a use of internal resources by the media gateway controller that is registered in the media gateway device.

2. The network according to claim 1, wherein the media gateway device enters an in-service state upon a reception of a response to the service registration request from any of the plurality of media gateway controllers.

3. The network according to claim 1, wherein the media gateway device performs resending of the service registration request periodically to media gateway controllers from which a response to the service registration request cannot be normally received.

4. The network according to claim 1,
   wherein the media gateway device includes a plurality of media processing means that process at least voice data and voice packets, and
   the plurality of media gateway controllers individually send the resource information request either by a method that specifies all of the plurality of media processing means and sends the resource information request or by a method that specifies the plurality of media processing means individually and sends the resource information request.

5. A media gateway device controlled by a plurality of media gateway controllers, said media gateway device comprising:

means for sending a service registration request to the plurality of media gateway controllers;

means for registering in the media gateway device a media gateway controller that normally returns a response to the service registration request; and means for notifying internal resource information of the media gateway device to each media gateway controller of the plurality of media gateway controllers when the media gateway device receives a resource information request that requests the internal resource information of the media gateway device from any of the plurality of media gateway controllers, wherein the media gateway device enables a use of internal resources by the media gateway controller that is registered in the media gateway device.

6. The media gateway device according to claim 5, wherein the media gateway device enters an in-service state upon a reception of a response to the service registration request from any of the plurality of media gateway controllers.

7. The media gateway device according to claim 5, wherein the media gateway device performs a resending of the service registration request periodically to media gateway controllers from which a response to the service registration request cannot be normally received.

8. The media gateway device according to claim 5, further comprising a plurality of media processing means that process at least voice data and voice packets, wherein in response to the resource information request that is sent from the plurality of media gateway controllers individually either by a method that specifies all of the plurality of media processing means and sends the resource information request or by a method that specifies the plurality of media processing means individually and sends the resource information request, the internal resource information of the media gateway device is notified to the plurality of media gateway controllers.

9. An internal resource management method that manages internal resources of a media gateway device in a network in which a plurality of media gateway controllers control the media gateway device, wherein the media gateway device executes a processing that sends a service registration request to the plurality of media gateway controllers, a processing that registers in the media gateway device a media gateway controller that normally returns a response to the service registration request, and a processing that notifies internal resource information of the media gateway device to each media gateway controller of the plurality of media gateway controllers when the media gateway device receives a resource information request that requests the internal resource information of the media gateway device from any of the plurality of media gateway controllers, and the media gateway device enables a use of internal resources by the media gateway controller that is registered in the media gateway device.

10. The internal resource management method according to claim 9, wherein the media gateway device enters an in-service state upon a reception of a response to the service registration request from any of the plurality of media gateway controllers.

11. The internal resource management method according to claim 9, wherein the media gateway device performs a resending of the service registration request periodically to media gateway controllers from which a response to the service registration request cannot be normally received.

12. The internal resource management method according to claim 9, wherein the media gateway device includes a plurality of media processing means that process at least voice data and voice packets, and the plurality of media gateway controllers individually send the resource information request either by a method that specifies all of the plurality of media processing means and sends the resource information request or by a method that specifies the plurality of media processing means individually and sends the resource information request.

13. The network according to claim 1, wherein more than one of said plurality of media gateway controllers register in said media gateway device, and said media gateway device enables the use of internal resources comprising channels that can be processed by each media gateway controller that is registered in said media gateway device.

14. The network according to claim 13, wherein said use of said internal resources by said more than one media gateway controller comprises use without a partitioning of said internal resources of said media gateway device.

15. The media gateway device according to claim 5, wherein more than one of said plurality of media gateway controllers register in said media gateway device, and said media gateway device enables the use of internal resources comprising channels that can be processed by each media gateway controller that is registered in said media gateway device.

16. The media gateway device according to claim 15, wherein said use of said internal resources by said more than one media gateway controller comprises use without a partitioning of said internal resources of said media gateway device.

17. The internal resource management method according to claim 9, wherein more than one of said plurality of media gateway controllers register in said media gateway device, and said media gateway device enables the use of internal resources comprising channels that can be processed by each media gateway controller that is registered in said media gateway device.

18. The internal resource management method according to claim 17, wherein said use of said internal resources comprises use without a partitioning of said internal resources of said media gateway device.

* * * * *